United States Patent

[11] 3,624,782

| [72] | Inventors | Orlin A. McPeek<br>Whittier;<br>Arnold B. Nordstrom, La Habra, both of Calif. |
|---|---|---|
| [21] | Appl. No. | 815,891 |
| [22] | Filed | Apr. 14, 1969 |
| [45] | Patented | Nov. 30, 1971 |
| [73] | Assignee | Aircraft Mechanics, Inc.<br>Colorado Springs, Colo. |

[54] SEMIAUTOMATIC PALLETIZER
4 Claims, 5 Drawing Figs.

[52] U.S. Cl. .................................................. 214/6 P,
214/6 DK, 214/1 BE
[51] Int. Cl. ................................................ B65g 57/24
[50] Field of Search ........................................ 214/6 P, 6
K, 6 H, 6 G

[56] References Cited
UNITED STATES PATENTS

| 3,137,286 | 6/1964 | Raynor ........................... | 214/6 K |
| 2,633,251 | 3/1953 | Bruce ............................. | 214/6 H X |
| 2,886,190 | 5/1959 | Beaulieu et al. ................. | 214/6 H |
| 2,947,428 | 8/1960 | Curtenius ....................... | 214/6 H |
| 2,960,243 | 11/1960 | Beaulieu ........................ | 214/6 H |
| 3,028,979 | 4/1962 | Zachow .......................... | 214/6 K |
| 3,157,294 | 11/1964 | Bolt ................................ | 214/6 H |
| 3,245,557 | 4/1966 | Maramonte et al. ............ | 214/6 P |
| 3,282,566 | 11/1966 | Clarke ............................ | 214/6 H UX |
| 3,312,357 | 4/1967 | Stephens et al. ................ | 214/6 K |
| 3,429,469 | 2/1969 | Peterson ........................ | 214/6 K X |
| 3,483,065 | 12/1969 | O'Brien .......................... | 214/6 K X |

*Primary Examiner*—Gerald M. Forlenza
*Assistant Examiner*—Robert J. Spar
*Attorney*—McNenny, Farrington, Pearne and Gordon

ABSTRACT: A semiautomatic machine is provided to load parcels layer by layer onto a pallet. The machine includes an elevated arranging table on which parcels are manually arranged into desired patterns. After a layer has been assembled, the table may be retracted to drop the layer onto a pallet or preceding layer. An elevator is provided to support the pallet or preceding layer at a level immediately below the arranging table. When the desired number of layers are accumulated, the pallet is discharged and a new one is automatically supplied. The upper surface of the arranging table is perforated to permit the flow of pressurized air therethrough to support the weight of the parcels thereon to minimize sliding friction and, therefore, manual effort.

INVENTORS
ORLIN A. McPEEK,
& ARNOLD B. NORDSTROM
BY
McNENNY, FARRINGTON, PEARNE & GORDON
ATTORNEYS

INVENTORS
ORLIN A. MCPEEK,
& ARNOLD B. NORDSTROM
BY
MCNENNY, FARRINGTON, PEARNE & GORDON

ATTORNEYS

SEMIAUTOMATIC PALLETIZER

BACKGROUND OF THE INVENTION

This invention relates to a work-saving device to be employed in material-handling operations. More particularly, this invention considers a semiautomatic palletizer.

Commonly, materials are stacked on pallets or wooden platforms to improve handling efficiency. Used with lift trucks, such pallets, after being loaded, may be easily moved to storage locations or to a carrier for shipping. Palletizer machines have been provided to eliminate human effort which would otherwise be required to lift and arrange materials on these pallets. At the same time, while reducing human effort, a palletizer machine frequently speeds up pallet loading operations in many situations.

PRIOR ART

In the past, highly automated, high-volume palletizer machines have been provided. Such machines have been developed with automatic sequence control to automatically feed and arrange parcels into layers. Layers are successively stacked on pallets which are also automatically fed into and discharged from these machines. As a consequence of the degree of automation, these machines have been relatively complex and expensive. Moreover, the degree of complexity often found in these machines requires highly qualified operators and technicians to maintain them.

SUMMARY OF THE INVENTION

The semiautomatic pallet-loading machine of the invention receives parcels from a feed conveyor. Parcels are individually manually arranged as they are received on an elevated arranging table. When enough packages have been arranged into a desired pattern, the operator presses a control button to retract the table. As the table retracts, the arranged layer of parcels drops onto a pallet or onto a preceding layer or layers on the pallet. When the table is fully retracted, an elevator supporting the pallet automatically descends. When the top layer has descended sufficiently, a photocell circuit is energized to automatically stop the elevator and reextend the arranging table. After the desired number of layers have been loaded, the operator pushes another control button to lower the pallet onto a conveyor which carries it from the machine and simultaneously feeds a new pallet into the machine.

An important feature of this invention is the use of air to support the parcels as they are arranged on the elevated arranging table. A blower is connected to this table to supply pressurized air through holes in its upper surface. The air support allows easy manipulation of the parcels into a desired layer pattern. Friction between the surface of the elevator table and the bottom of the parcels is substantially eliminated.

Accordingly, this palletizer substantially reduces the physical effort required of the operator. No lifting of parcels by the operator is required and a minimum of physical effort is required to manipulate them. The level at which these parcels are manipulated, moreover, is at a constant and convenient level with respect to the operator.

Only a limited number of manual controls need be operated to load a pallet and discharge it from the machine. The use of relatively simple mechanical components and control elements requires correspondingly limited operator skill and machine maintenance.

The objects and advantages of the present invention and the method of achieving them will be more fully understood from the following description of the invention and from the accompanying drawings illustrating the same, it being understood that the drawings and specific description of the invention are presented as an example of a presently preferred form of the invention without intending that the invention be considered limited thereto.

DESCRIPTION OF THE PREFERRED EMBODIMENT

Figure 1:
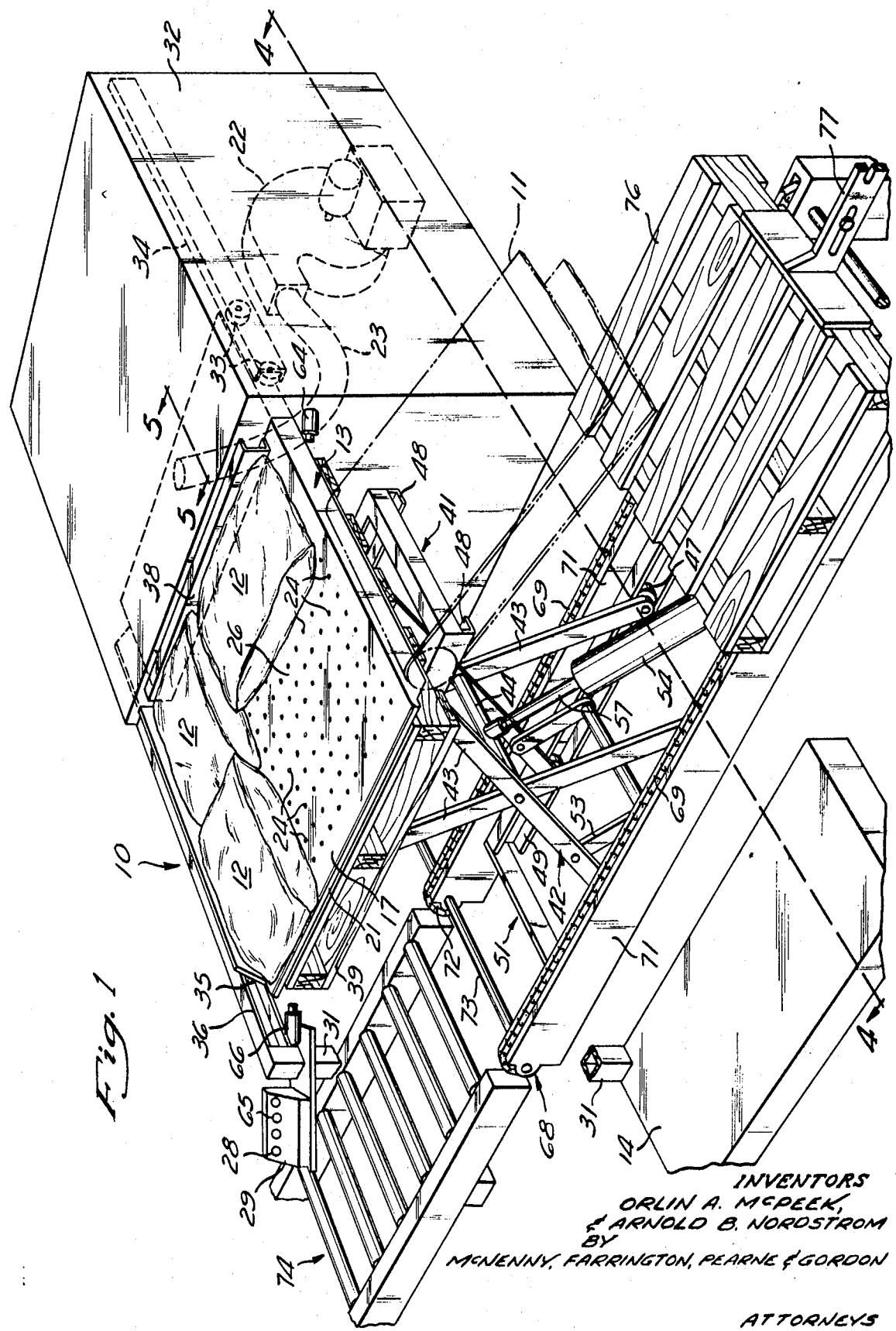
FIG. 1 is a partially fragmented perspective view of the palletizer machine which embodies this invention.
Figure 3:
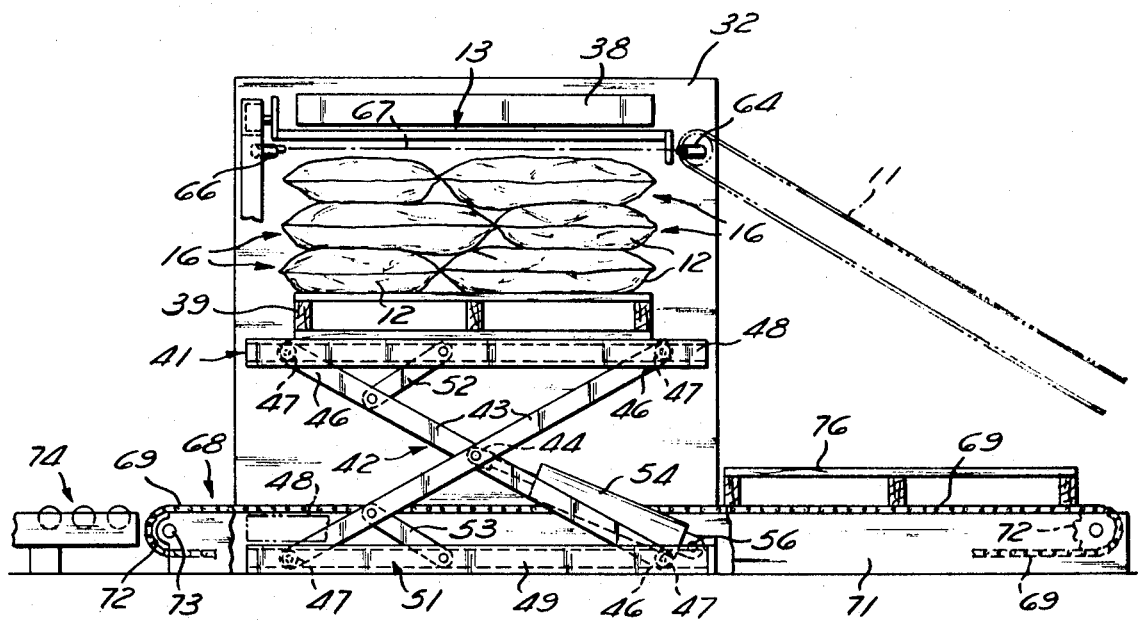
FIG. 3 is a front elevational view, similar to that shown in FIG. 2, showing the scissors-type elevator in an intermediate position.

Referring now to FIG. 1, a palletizer 10 is shown being serviced by a feed conveyor 11. Parcels 12, in this instance shown as bags, are conveyed onto an elevated arranging table 13 at a point in front of an operator stand 14. Each bag 12 is positioned on the elevated table 13 according to a desired pattern determined by the operator. The pattern of each layer may be alternated as shown in FIG. 3 to form an interlocking support between layers 16 to ensure stability of the final stack.

Figure 5:
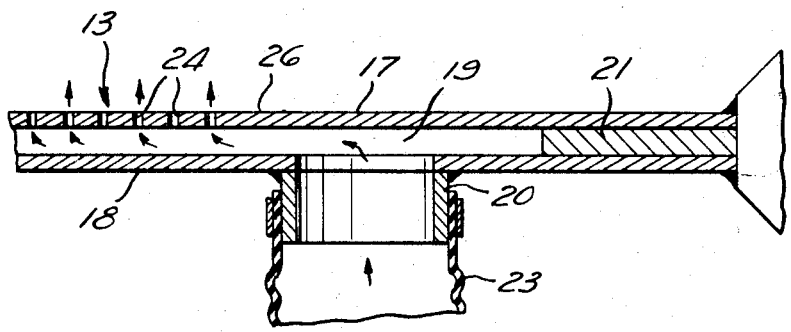
FIG. 5 is a sectional view on an enlarged scale of a portion of the elevated table and its air connection, the plane of the section being indicated by the line 5—5 in FIG. 1.

The elevated arranging table 13 comprises an upper perforated rectangular plate 17 and a corresponding solid rectangular lower plate 18 as shown in FIG. 5. A shallow box or plenum chamber 19 is formed by these plates and edge strips 21 welded to them. A blower 22 delivers air through a flexible hose 23 to the plenum 19 of the elevated table 13. The hose 23 is connected to the table 13 by means of a flange 20. Pressurized air escapes from the plenum 19 through holes 24 in the upper plate 17 of the elevated table. Escaping air supports a substantial portion of the weight of the bags 12. Thus, sliding friction between the lower surface of the bags 12 and the working surface 26 of the upper plate 17 is nearly eliminated. Manual effort required to manipulate the bags 12 into a desired pattern is thereby minimized. It can be seen, of course, that no lifting need be done by an operator while arranging a layer; moreover, the level at which each layer is composed remains constant. The elevated stand 14 supports an operator at an advantageous height for manipulation of the bags 12 at a level slightly above his waist.

Figure 4:
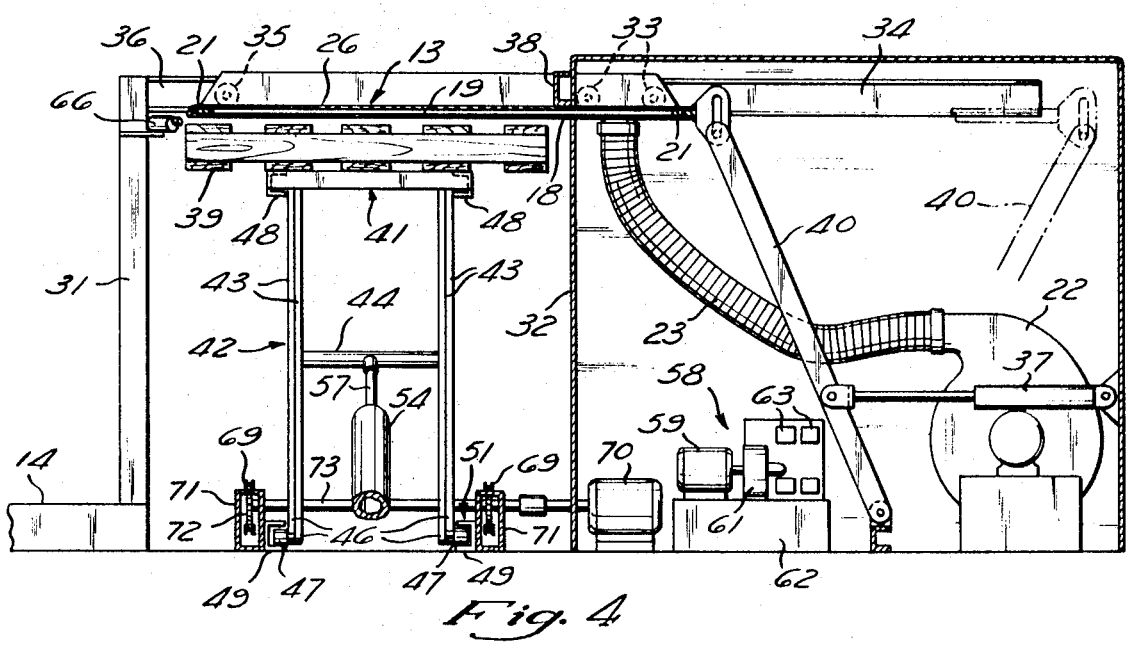
FIG. 4 is a sectional view of the machine, the plane of the section being indicated by the line 4—4 in FIG. 1.

When a layer has been fully assembled, the operator presses a control button 28 on a control box 29 which is secured to a frame 31. This causes automatic retraction of the elevated table 13 into a frame housing 32. Dual rollers 33 mounted on both sides of the elevated table 13 roll in associated channels 34 provided on both sides of the machine, allowing retraction and extension of the elevated table 13. An additional roller 35 is guided by a channel 36 on one side of the machine to minimize the cantilever effect of the elevated table. Referring to FIG. 4, it can be seen that the table is retracted and extended by means of a hydraulic piston and cylinder 37 acting upon the table by means of an actuating lever 40. During retraction, a layer of parcels 12 is forced off the elevated table by a stop plate 38 mounted on the frame housing 32.

Figure 2:
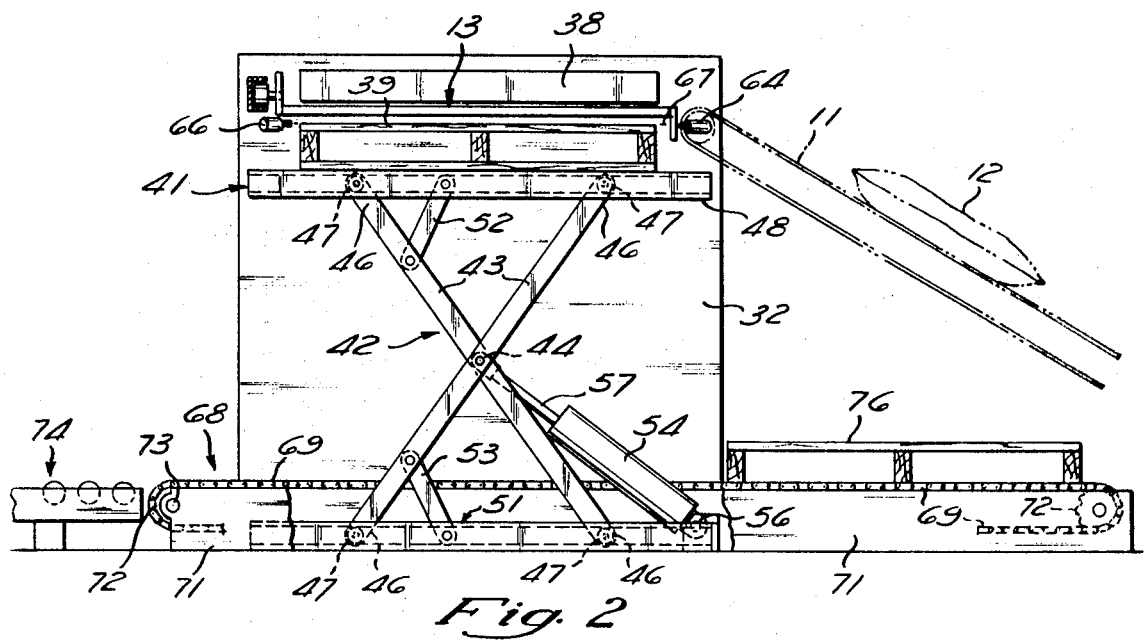
FIG. 2 is a front elevational view of the scissors-type elevator in its fully extended position.

A pallet 39 is supported immediately below the level of the elevated table 13 to receive the first layer of parcels 12 (see FIG. 2). When the elevated table 13 is fully retracted into the frame housing 32, the pallet 39 is automatically lowered. The pallet 39 is supported on an elevator platform 41. This platform 41 is part of a scissors-type elevator 42 shown most clearly in FIGS. 2 and 3. The scissors elevator 42 includes two spaced sets of crossed legs 43 which are pivoted about a common shaft 44. Fastened to each end 46 of each crossed leg 43 are rollers 47. The rollers 47 are restrained to roll in channels 48 and 49 formed by the elevator platform frame 41 and the elevator base frame 51 respectively. The crossed legs 43 are pivotally fixed to the elevator platform 41 and the elevator base frame 51 by links 52 and 53 respectively.

When discharging a loaded pallet, the elevator is lowered to a position where the platform frame 41 rests immediately above the base frame 51. This full retraction minimizes overall machine height since the height of the elevated table 13 depends, for a given layer capacity, on the lowest possible position of a pallet 39. As a result, the operator stand 14 may be mounted relatively close to the ground to minimize the height to which an operator must climb. The scissors elevator 42 is actuated by a hydraulic cylinder 54 pinned at one end 56 to the base frame 51 of the elevator. A piston rod 57 of the cylinder 54 is mounted to the cross shaft 44.

A hydraulic module 58 (see FIG. 4) is provided to drive the hydraulic cylinders 54 and 37. The hydraulic module 58 includes a motor 59, a pump 61, a reservoir 62 and control valves 63 which are operated by means of the push buttons on the control box 29.

A photocell 64 and light source 66 are provided to sense when the top layer of bags has descended sufficiently to allow reextension of the elevated table 13. FIGS. 2 and 3 show the relationship of the light beam 67 with the elevated table 13. The light beam 67 is interrupted when a layer of bags is dropped from the elevated table 13. When the elevator 42 has lowered the top layer of the bags 12 sufficiently, the photocell 64 is again illuminated. This causes the elevator 42 to stop and the elevated table 13 to automatically reextend. A new layer of bags 12 may then be arranged on the elevated table 13.

After the desired number of layers have been stacked on a pallet 39 the operator presses a control button 65 to lower the elevator 42 until the pallet is supported by a chain conveyor 68. The chain conveyor 68 includes two endless chains 69 which straddle the crossed legs 43 of the elevator 42. These endless chains 69, commonly driven by the shaft 73, are guided by frame rails 71 and chain sprockets 72, located at each end of the frame rails. Operation of the chain conveyor 68 by means of a motor 70, carries a loaded pallet from the palletizer 10 onto an exit roller conveyor 74 from which it may be carried by a lift truck. As a loaded pallet is being carried from the palletizer, an empty pallet 76 is simultaneously carried to a position over the retracted elevator 42 to be subsequently lifted into a loading position. The empty pallet 76 is positioned against an adjustable pallet stop 77 to ensure that it will be properly located under the extended position of the elevated table 13 when the on cycle of the chain conveyor 68 is fixed.

We claim:

1. A semiautomatic palletizer comprising frame means supporting an elevated table for reciprocating motion thereon, said table being reciprocal between an extended position and a retracted position, means to extend and retract said table, parcel feed means adjacent said table, said table, when in said extended position, receiving parcels across one side thereof of undetermined orientation directly from said adjacent parcel feed means, a pallet-receiving zone under the extended position of said table, elevator means including a platform to support a pallet in said pallet-receiving zone, said pallet being supported below said table to receive successive layers of parcels as said table is retracted, said frame means including stop means to force said parcels off said table as it is retracted, control means to operate said elevator means, said elevator platform being movable between a lower station and an upper station, said elevator platform at said upper station supporting said pallet at a level immediately below said table to receive a first layer of said parcels, said elevator platform being indexed by said control means to support said pallet at a multiplicity of intermediate levels separated by a distance corresponding to the height of a parcel layer, pallet delivery conveyor means extending from an area adjacent said elevator means into said pallet-receiving zone, said pallet delivery conveyor means adapted to receive an empty pallet at said adjacent area and to convey said empty pallet from said adjacent area onto said elevator means when the elevator platform is in said lower position and to simultaneously remove a loaded pallet from the elevator means, said elevated table including upper and lower substantially parallel plate members and associated edge means cooperating to form a box structure having a hollow interior, said upper plate having a multiplicity of perforations in its upper surface communicating with the interior of said table, pressurized air supply means connected to the hollow interior of said table and adapted to supply pressurized air to said interior of said table, said perforations adapted to permit pressurized air to escape from said interior of said table so that the pressure of said escaping air at least partially supports said parcels to reduce sliding friction between each parcel and said upper surface of the table thereby facilitating manual orientation and arrangement of said parcels on said table, and an operator station located in directly adjacent and confronting relationship with another side of said table when in said extended position thereby permitting direct operator access to substantially all areas of said table while it is extended, said table retracting in a direction away from said operator station, said pallet delivery conveyor means including longitudinal guide rails horizontally displaced from said adjacent area into said pallet receiving zone.

2. A semiautomatic palletizer as set forth in claim 1 wherein said control means includes a photoelectric cell sensing the position of the upper layer of said parcels to determine when such layer has descended sufficiently to permit reextension of said table for the assembly of a subsequent layer of parcels.

3. A semiautomatic palletizer as set forth in claim 1 wherein said elevator means includes a scissors-type lift means actuated by a fluid power means.

4. A semiautomatic palletizer as set forth in claim 3 wherein said fluid power means includes a hydraulic piston and cylinder means.

* * * * *

UNITED STATES PATENT OFFICE
CERTIFICATE OF CORRECTION

Patent No. 3,624,782  Dated November 30, 1971

Inventor(s) Orlin A. McPeek and Arnold B. Nordstrom

It is certified that error appears in the above-identified patent and that said Letters Patent are hereby corrected as shown below:

Column 4, line 39, Claim 1, after "from" insert

--said operator station and extending from--

Signed and sealed this 11th day of March 1975.

(SEAL)
Attest:

RUTH C. MASON
Attesting Officer

C. MARSHALL DANN
Commissioner of Patents
and Trademarks